(12) United States Patent
Chan et al.

(10) Patent No.: US 9,020,439 B1
(45) Date of Patent: Apr. 28, 2015

(54) REDUCING CALIBRATION TESTING TIME

(75) Inventors: Kai Chieh Chan, Fremont, CA (US);
Marc Jacobs, Redwood City, CA (US)

(73) Assignee: Marvell International Ltd., Hamilton (BM)

( * ) Notice: Subject to any disclaimer, the term of this patent is extended or adjusted under 35 U.S.C. 154(b) by 559 days.

(21) Appl. No.: 12/877,585

(22) Filed: Sep. 8, 2010

Related U.S. Application Data (60) Provisional application No. 61/296,814, filed on Jan. 20, 2010.

(51) Int. Cl.
*H04B 17/00* (2006.01)
*H04B 7/10* (2006.01)

(52) U.S. Cl.
CPC ...................................... *H04B 7/10* (2013.01)

(58) Field of Classification Search
USPC ...................................................... 455/67.11
See application file for complete search history.

(56) References Cited

U.S. PATENT DOCUMENTS

| | | | |
|---|---|---|---|
| 5,418,855 A * | 5/1995 | Liang et al. | 713/179 |
| 5,546,329 A * | 8/1996 | Kurtzberg et al. | 702/83 |
| 6,418,301 B1 * | 7/2002 | Le et al. | 455/73 |
| 2005/0113951 A1 * | 5/2005 | Akiyama et al. | 700/97 |
| 2005/0221764 A1 * | 10/2005 | Shen et al. | 455/67.15 |
| 2005/0221765 A1 * | 10/2005 | Shen et al. | 455/73 |
| 2007/0052584 A1 * | 3/2007 | Horton et al. | 342/357.06 |
| 2008/0140331 A1 * | 6/2008 | Kalinin | 702/88 |
| 2008/0285467 A1 * | 11/2008 | Olgaard | 370/242 |
| 2009/0029651 A1 * | 1/2009 | Polini et al. | 455/68 |
| 2009/0164165 A1 * | 6/2009 | Homer et al. | 702/107 |

* cited by examiner

*Primary Examiner* — David Bilodeau (57) ABSTRACT

Embodiments of the present disclosure provide a method directed towards applying an average radio calibration result obtained from one or more units of a manufacturing order to another unit of the manufacturing order and performing a verification test on the other unit to determine whether the other unit is calibrated to a pre-determined specification. Other embodiments may be described and/or claimed.

19 Claims, 5 Drawing Sheets

REDUCING CALIBRATION TESTING TIME

CROSS REFERENCE TO RELATED APPLICATIONS

The present application claims priority to U.S. Provisional Patent Application No. 61/296,814, filed Jan. 20, 2010 the entire specification of which is hereby incorporated by reference in its entirety for all purposes, except for those sections, if any, that are inconsistent with this specification.

TECHNICAL FIELD

Embodiments of the present disclosure relate to the field of testing electronic assemblies, and more particularly, to techniques and configurations to reduce calibration testing time for radio devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Production testing of radio devices generally includes calibration followed by a verification test for each radio device. The calibration is used, for example, to tune radio settings of a particular radio device according to a specification such as an Institute of Electrical and Electronics Engineers (IEEE) specification. The verification process helps ensure that the calibration is within the specification. Because the calibration is performed on each production unit, calibration can take about 30% of a total module test time in a manufacturing setting. Reducing calibration testing time generally facilitates much shorter manufacturing test time on radio devices in mass production and provides cost savings.

SUMMARY

The present disclosure provides a method comprising applying an average radio calibration result obtained from one or more units of a manufacturing order to another unit of the manufacturing order and performing a verification test on the other unit to determine whether the other unit is calibrated to a pre-determined specification.

In an embodiment, the method further includes determining the average radio calibration result by calibrating the one or more units, wherein the one or more units comprise a number that is less than a total number of units in the manufacturing order, performing a verification test on the one or more units that receive said calibrating to determine whether the one or more units are calibrated to the pre-determined specification, recording a radio calibration setting for each of the one or more units that is determined to be calibrated to the pre-determined specification, and calculating the average radio calibration result based on the recorded radio calibration setting In an embodiment, the method further includes using a counter to indicate a number of units in the manufacturing order to be used to calculate the average radio calibration result and adjusting the counter based on said recording the radio calibration setting.

In an embodiment, said applying an average radio calibration result and said performing a verification test are performed for each unit of the manufacturing order except for the one or more units from which the average radio calibration result is obtained.

In an embodiment, the method further includes calibrating the other unit if the other unit is not calibrated to the pre-determined specification as determined by the verification test, and performing another verification test on the other unit subsequent to said calibrating the other unit, said performing another verification test being performed to determine whether the other unit is calibrated to the pre-determined specification.

In an embodiment, the method further includes updating the average radio calibration result to include a calibration setting used to calibrate the other unit if the other unit is calibrated to the pre-determined specification as determined by said performing another verification test.

In an embodiment, all units of the manufacturing order are processed together in a single lot.

The present disclosure further provides an apparatus comprising a calibration module for applying an average radio calibration result obtained from one or more units of a manufacturing order to another unit of the manufacturing order and a verification module for performing a verification test on the other unit to determine whether the other unit is calibrated to a pre-determined specification.

In an embodiment, the apparatus further includes a determining module for determining the average radio calibration result by calibrating the one or more units, wherein the one or more units comprise a number that is less than a total number of units in the manufacturing order, performing a verification test on the one or more units that receive said calibrating to determine whether the one or more units are calibrated to the pre-determined specification, recording a radio calibration setting for each of the one or more units that is determined to be calibrated to the pre-determined specification, and calculating the average radio calibration result based on the recorded radio calibration setting.

In an embodiment, the apparatus further includes a counter to indicate a number of units in the manufacturing order to be used to calculate the average radio calibration result.

In an embodiment, the calibration module is configured to apply an average radio calibration result and the verification module is configured to perform a verification test for each unit of the manufacturing order except for the one or more units from which the average radio calibration result is obtained.

In an embodiment, the calibration module is further configured to calibrate the other unit if the other unit is not calibrated to the pre-determined specification as determined by the verification test and the verification module is further configured to perform another verification test on the other unit subsequent to calibrating the other unit, the other verification test being performed to determine whether the other unit is calibrated to the pre-determined specification.

In an embodiment, the calibration module is further configured to update the average radio calibration result to include a calibration setting used to calibrate the other unit if the other unit is calibrated to the pre-determined specification as determined by the other verification test.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure describe module testing techniques and configurations to reduce calibration testing time for radio devices. In the following detailed description, reference is made to the accompanying drawings which form a part hereof, wherein like numerals designate like parts throughout. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

Various operations are described as multiple discrete operations, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
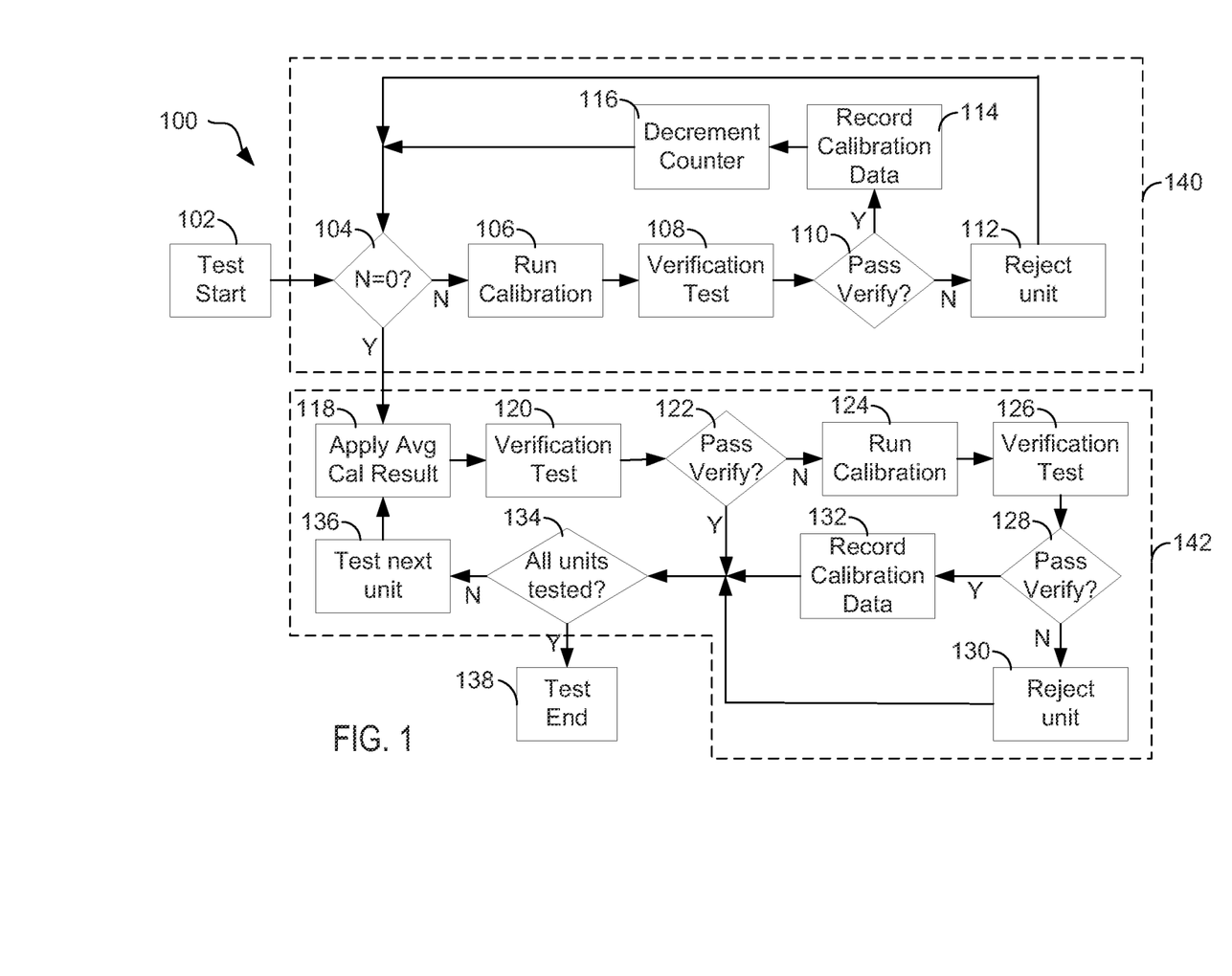
FIG. 1 schematically illustrates a flow diagram for testing radio device units, in accordance with various embodiments.

FIG. 1 schematically illustrates a flow diagram of a method 100 for testing radio device units, in accordance with various embodiments. The method 100 can be used to reduce calibration testing time for radio devices in wireless semiconductor modules or system-in-package (SIP) production testing or other suitable radio calibration environments. The method 100 can be used to test radio devices for wireless local area networks (LANs), personal area networks (PANs) such as Bluetooth technologies, frequency modulation (FM) technologies, or global positioning system (GPS) technologies. Subject matter is not limited in this regard and the method 100 can be used to test other suitable radio devices in other embodiments.

Radio devices may be manufactured and assembled into one or more units of a manufacturing order (MO). The MO is used to manage assembly and test of the radio devices in module production. For example, the MO can represent a particular order for a particular product. In a semiconductor manufacturing environment, radio devices of a MO can be processed as a single lot to reduce process variations that may affect radio device characteristics. In an embodiment, the method 100 is used to test units of a MO having radio devices that are processed together as a single lot.

The method 100 includes a first portion 140 directed towards determining an average radio calibration result (ARCR) and a second portion 142 directed towards applying the ARCR to reduce calibration time in production testing, also referred to herein as "calibration-free" module testing. That is, a fraction of the units of a MO may be tested using first portion 140 of the method 100 to determine an ARCR to be applied in the second portion 142 to a remaining fraction of the units of the MO. The fraction of the units of a MO tested using first portion 140 may be relatively small compared to a total number of units in the MO. According to various embodiments, a number of units used to calculate the ARCR in first portion 140 may be between about 1% and about 3% of the total number of units in the MO. The disclosure is not limited to this example range. Other fractions or percentages of the total number of units in the MO can be used in other embodiments.

The fraction used in the first portion 140 may depend on statistical information gathered for the type of radio device being tested. For example, if a failure rate is statistically higher for a particular type of radio device compared to other radio devices, the fraction used in first portion 140 may be greater (e.g., about 3%) and if the failure rate is statistically lower for the particular type of radio device compared to other radio devices, the fraction used in first portion 140 may be smaller (e.g., about 1%).

A counter may be used to indicate the number of units to be tested to calculate the ARCR using first portion 140. For example, a counter may be set to N=600 to represent 2% of a MO having 30,000 units. At 102, the testing starts for the MO. At 104, the method 100 includes determining whether the counter N has a value of zero. Other techniques may be used to indicate a number of units to be tested such as a counter that increments until a designated number of units has been tested.

If the counter does not have a value of zero at 104, then calibration is performed on a unit of the MO at 106. Calibration is used to tune a radio setting of the unit in accordance with a pre-determined specification such as, for example, an IEEE standard (e.g., IEEE 802.11, IEEE 802.16, IEEE 802.15), GPS specifications, or other standards, protocols, or specifications such as a performance requirement requested by a customer. According to various embodiments, calibration can include calibration for transmitter (Tx) power, transmitter/receiver (Tx/Rx) in-phase quadrature (IQ), local oscillator (LO) spurs, and/or crystal frequency.

At 108, a verification test is performed on the unit that is calibrated at 106 to determine or verify that the unit has been calibrated to or within a pre-determined specification. A variety of monitors or tests can be performed to verify that the calibration of the unit is within the pre-determined specification including measuring the Tx power, the Tx/Rx IQ, the LO spurs, or the crystal frequency and comparing the measured result with the pre-determined specification for the respective radio setting. If the unit does not pass the verification test at 110 (e.g., the calibration is not within the pre-determined specification), then at 112 the unit is rejected at 112, the counter remains the same, and at 104, 106, and 108 another unit is tested.

If the unit passes the verification test at 110 (e.g., the calibration is within the pre-determined specification), then at 114 calibration data associated with running calibration (e.g., at 106) for the unit is recorded. The calibration data can be recorded, for example, by storing the calibration data in any suitable storage device. The calibration data can include, for example, settings used to tune the Tx power, Tx/Rx IQ signals, LO spurs, and/or crystal frequency for the unit. According to various embodiments, a running ARCR is maintained and each time calibration data is recorded for a unit of the MO at 114, the running ARCR is updated to reflect an average radio calibration setting for the units tested using first portion 140 of method 100.

After recording the calibration data at 114, at 116 the counter is decremented by one (e.g., N−1) to reflect that calibration data is successfully recorded for the unit. The process flow then returns to 104 to determine whether the counter is set to zero. If not, then the actions of first portion 140 are performed for another unit of the MO. For example, calibration data may be captured using 106, 108, 110, and 114 until N units have been tested using the first portion 140 of method 100. The running ARCR is updated each time calibration data is recorded at 114 to provide an ARCR for N units at the completion of the first portion 140 of method 100.

The second portion 142 of the method 100 is performed subsequent to performing the first portion 140 of method 100 (e.g., when N=0 at 104). The second portion 142 is performed by applying the ARCR at 118, obtained using the first portion 140, to the remainder of the units of the MO that have not been tested using the first portion 140. The second portion 142 is referred to as "calibration-free" testing to indicate that calibration is not performed on each unit tested using the second portion 142. Instead, the ARCR obtained by calibrating N units of the MO using first portion 140 is applied at 118 to units tested using the second portion 142.

At 118, the ARCR obtained from one or more units of the MO using first portion 140 is applied to another unit of the MO that is not tested using first portion 140 of the method 100. The ARCR can be applied, for example, by loading the ARCR into a storage device coupled to the unit. The ARCR can include, for example, an average calibration setting (e.g., Tx power, Tx/Rx IQ, the LO spurs, or crystal frequency) for N units tested using first portion 140. The storage device can be, for example, a type of electrically erasable programmable read-only memory (EEPROM) to store calibration settings for the one or more units of the MO tested using method 100. Subject matter is not limited in this regard and the storage device can be a variety of other types of suitable storage devices in other embodiments.

At 120, a verification test is performed on the unit receiving the applied ARCR to determine whether the unit is calibrated to or within the pre-determined specification. The verification test includes, for example, measuring the Tx power, the Tx/Rx IQ, the LO spurs, and/or the crystal frequency and comparing the measured result with a pre-determined specification for the respective radio setting being tested. If the unit passes the verification test at 120 (e.g., the applied ARCR is within the pre-determined specification), then, at 134, the method 100 includes determining whether all units and all units of the MO have been tested. If all units of the MO have been tested at 134, then the test ends at 138 for the MO. Otherwise, if all units have not been tested at 134, then the next unit of the MO is tested at 136 by applying the ARCR at 118, performing the verification test at 120, and other actions of the process flow depicted for the second portion 142.

If the unit does not pass the verification test at 122, then at 124 the unit is calibrated using calibration techniques similar to the calibration performed at 106 of the first portion 140 of the method 100. That is, radio settings (e.g., Tx power, Tx/Rx IQ, the LO spurs, and/or crystal frequency) are tuned for the unit based on radio characteristics of the same unit being tested. At 126, a verification test is performed to determine whether the calibration at 124 is within the pre-determined specification. If the unit fails the verification test, then at 130 the unit is rejected. If the unit passes the verification test, then at 132 calibration data (e.g. calibration settings for Tx power, Tx/Rx IQ, the LO spurs, and/or crystal frequency) for the unit is recorded. According to various embodiments, the calibration data is aggregated with the ARCR applied at 118 to provide an updated ARCR that reflects the calibration data recorded at 132. If all units of the MO have been tested at 134, then at 138 the test ends. Otherwise, if all units of the MO have not been tested at 134, then at 136 the second portion 142 of the method 100 continues by testing another unit until all units of the MO have been tested.

Figure 2:
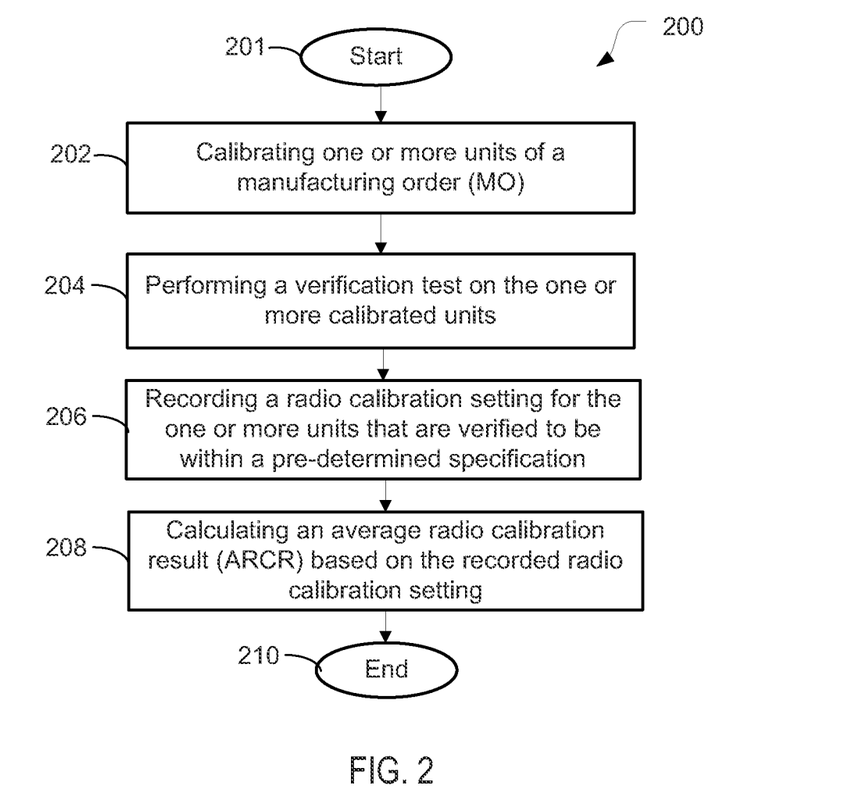
FIG. 2 schematically illustrates a flow diagram for a method to determine an average radio calibration result, in accordance with various embodiments.

FIG. 2 schematically illustrates a flow diagram for a method 200 to determine an average radio calibration result (ARCR), in accordance with various embodiments. The method 200 may comport with embodiments described in connection with the first portion 140 of method 100. At 201, the method 200 starts.

At 202, the method 200 includes calibrating one or more units of a manufacturing order (MO). The calibrating is performed on a number of units that is less than a total number of units in the MO. The one or more units may represent a fraction of the MO. According to various embodiments, a number of units used to determine the ARCR is between about 1% and about 3% of a total number of units in the MO. A counter may be used to indicate the number of units used to calculate the ARCR.

At 204, the method 200 further includes performing a verification test on the one or more calibrated units. The verification test is performed to determine whether the one or more units receiving the calibrating are calibrated within a pre-determined specification.

At 206, the method 200 further includes recording a radio calibration setting for the one or more units that are verified to be within the pre-determined specification based on results of performing the verification test. The radio calibration setting can include any calibration parameter associated with tuning, e.g., Tx power, Tx/Rx IQ, the LO spurs, and/or crystal frequency of a radio device of the one or more units. In an embodiment, the counter is decremented each time a unit is calibrated at 202, passes verification at 204, and has a radio calibration setting recorded at 206. When the counter reaches zero, then module testing for the remaining units of the MO are performed according to method 300 of FIG. 3.

At 208, the method 200 further includes calculating an average radio calibration result (ARCR) based on the recorded radio calibration setting. The ARCR can include one or more settings associated with tuning, e.g., Tx power, Tx/Rx IQ, the LO spurs, and/or crystal frequency of a radio device.

The ARCR may be a running average that is updated when a radio calibration setting is recorded at 206. At 210, the method 200 ends.

Figure 3:
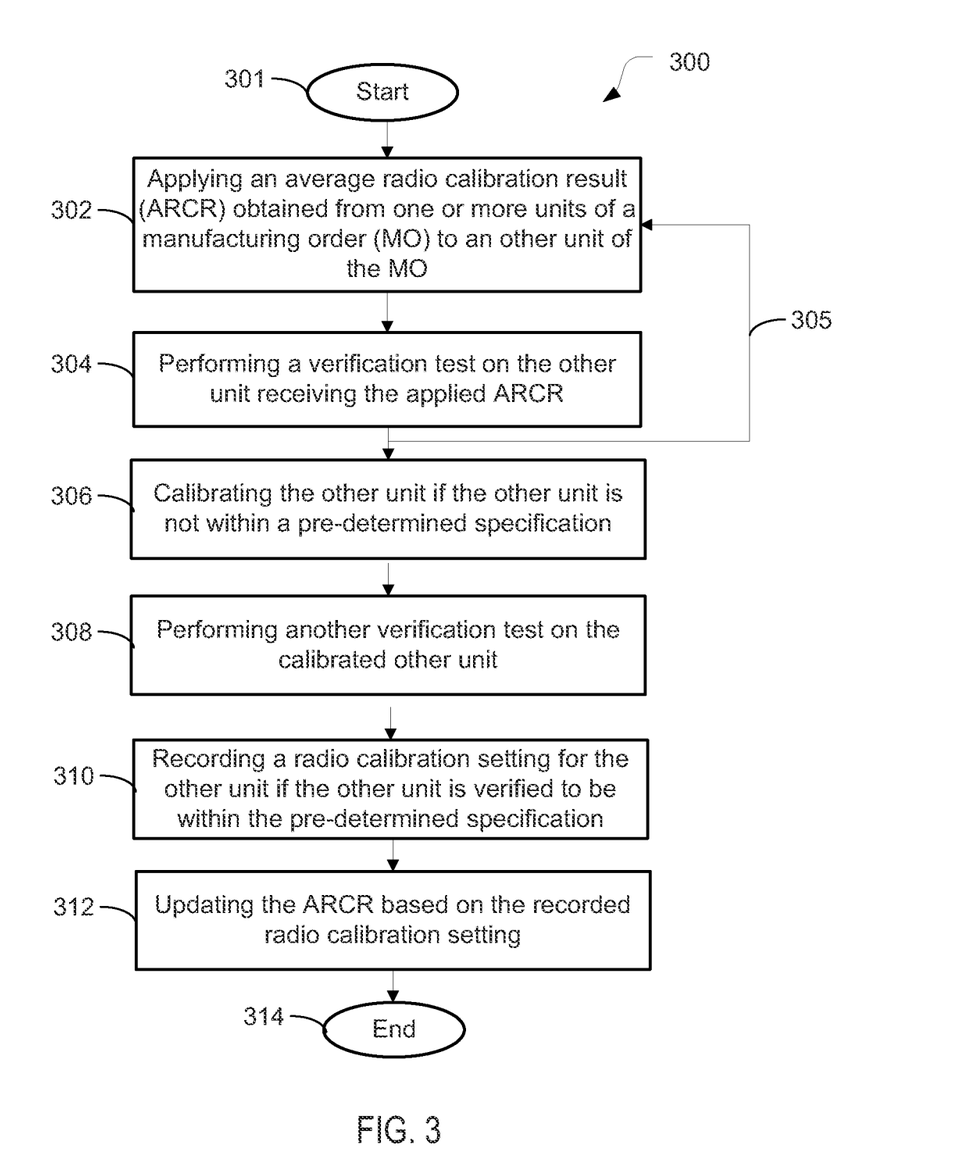
FIG. 3 schematically illustrates a flow diagram for a method to apply the average radio calibration result to reduce calibration time in testing radio device units, in accordance with various embodiments.

FIG. 3 schematically illustrates a flow diagram for a method 300 to apply the average radio calibration result (e.g., ARCR of method 200) to reduce calibration time in testing radio device units, in accordance with various embodiments. The method 300 may comport with embodiments described in connection with the second portion 142 of method 100. At 301, the method 300 starts.

At 302, the method 300 includes applying an ARCR obtained from one or more units of a MO to an other unit of the MO. That is, the ARCR obtained from sampling a fraction of units of the MO (e.g., using method 200) is applied to other units of the MO that have not been calibrated and/or verified. The "other unit" as described in connection with FIG. 3 is intended to represent a unit of the MO that undergoes, e.g., the second portion 142 of method 100. The ARCR can be applied to the other unit, for example, by loading the ARCR into a storage device (e.g., EEPROM) coupled to the other unit. The storage device can be part of the other unit in various embodiments.

Applying the ARCR to the other unit may save module testing time by reducing calibration testing. For example, units receiving the applied ARCR of method 200 can represent between about 97% to about 99% of the total units of the MO, which provides substantially "calibration-free" testing for a majority of units of the MO. Subject matter is not limited in this regard and the units receiving the applied ARCR can include other fractions or percentages in other embodiments.

At 304, the method 300 further includes performing a verification test on the other unit receiving the applied ARCR. The verification test is performed to determine whether the other unit is calibrated within the pre-determined specification. If the other unit passes the verification test (e.g., the unit is determined to be calibrated within the pre-determined specification), then, at 305, yet another unit of the MO is tested at 302 and 304. According to various embodiments, applying an ARCR at 302 and performing a verification test at 304 are performed for each unit of the MO except for the one or more units from which the average radio calibration result is obtained (e.g., units tested using method 200).

At 306, the method 300 further includes calibrating the other unit if the other unit is not within the pre-determined specification based on results of performing the verification test at 304. That is, if the other unit fails the verification test (e.g., the other unit is determined to not be calibrated within the pre-determined specification), then the other unit is calibrated at 306.

At 308, the method 300 further includes performing another verification test on the other unit receiving the calibration at 306. Another verification test is performed to determine whether the other unit is calibrated within the pre-determined specification.

At 310, the method 300 further includes recording a radio calibration setting for the other unit if the other unit is verified to be within the pre-determined specification based on the verification test performed at 308. The radio calibration setting can include any calibration parameter associated with tuning, e.g., Tx power, Tx/Rx IQ, the LO spurs, and/or crystal frequency of a radio device of the one or more units.

At 312, the method 300 further includes updating the ARCR based on the recorded radio calibration setting at 310. For example, the ARCR can be a running average that is updated with information (e.g., calibration setting) recorded at 310. The updated ARCR can then be applied at 302 to other units being tested under method 300. At 314, the method 300 ends.

Figure 4:
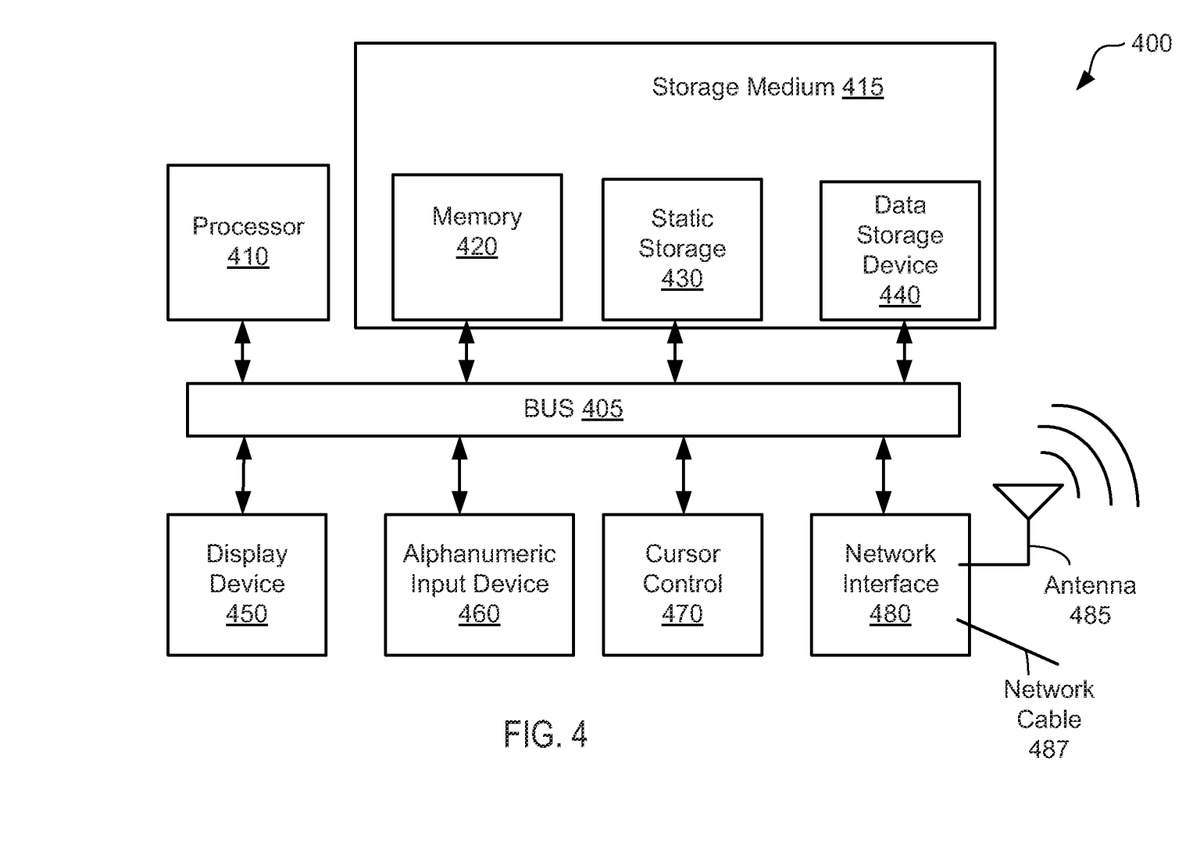
FIG. 4 schematically illustrates an electronic system configured to store and/or execute instructions that result in actions described herein.

FIG. 4 schematically illustrates an electronic system 400 configured to store and/or execute instructions that result in actions described herein. Electronic system 400 is intended to represent a range of electronic devices (either wired or wireless) including, for example, desktop computer devices, laptop computer devices, personal computers (PC), servers, printers, phones, personal digital assistants (PDA) including cellular-enabled PDAs, set top boxes, televisions, pocket PCs, tablet PCs, DVD players, video players, but is not limited to these examples and can include other electronic devices. Alternative electronic systems can include more, fewer and/or different components.

The electronic system 400 includes a bus 405 or other communication device or interface to communicate information, and processor 410 coupled to bus 405 to process information. Bus 405 can be a single system bus or a number of buses of the same or different types bridged together. The processor 410 is representative of one or more processors and/or co-processors.

The electronic system 400 also includes a storage medium 415, which represents a variety of types of storage including memory 420, static storage 430, and data storage device 440. The storage medium 415 is coupled to bus 405 to store information and/or instructions that are processed and/or executed by processor 410. The storage medium 415 can include more or less types of storage than depicted.

In an embodiment, the storage medium 415 comprises a storage device (e.g., 420, 430, or 440) having instructions stored thereon, that if executed by the processor 410, result in actions described herein (e.g., method 100, 200, or 300). For example, the storage device can include instructions stored thereon, that if executed by the processor 410, result in applying an average radio calibration result obtained from one or more units of a manufacturing order to another unit of the manufacturing order and performing a verification test on the other unit to determine whether the other unit is calibrated within a pre-determined specification. Other actions can be performed by the electronic system 400 in other embodiments.

The electronic system 400 includes random access memory (RAM) or other storage device 420 (may be referred to as "memory"), coupled to bus 405. The memory 420 is used to store temporary variables or other intermediate information during execution of instructions by processor 410. Memory 420 includes, for example, a flash memory device.

The electronic system 400 can also include read only memory (ROM) and/or other static storage device 430 coupled to bus 405 to store static information and instructions for processor 410. Data storage device 440 may be coupled to bus 405 to store information and instructions. Data storage device 440 can include, for example, a magnetic disk or optical disc and corresponding drive coupled with the electronic system 400.

The electronic system 400 is coupled via bus 405 to display device 450, such as a cathode ray tube (CRT) or liquid crystal display (LCD), to display information to a user. Alphanumeric input device 460, including alphanumeric and other keys, can be coupled to bus 405 to communicate information and command selections to the processor 410. Cursor control 470 is another type of input device and includes, for example, a mouse, a trackball, or cursor direction keys to communicate information and command selections to the processor 410 and to control cursor movement on the display 450.

The electronic system 400 further includes one or more network interfaces 480 to provide access to network 420, such as a local area network, but is not limited in this regard. The network interface 480 can include, for example, a wireless network interface having antenna 485, which may represent one or more antennae. The network interface 480 can also include, for example, a wired network interface to communicate with remote devices via network cable 487, which can be, for example, an Ethernet cable, a coaxial cable, a fiber optic cable, a serial cable, or a parallel cable.

Figure 5:
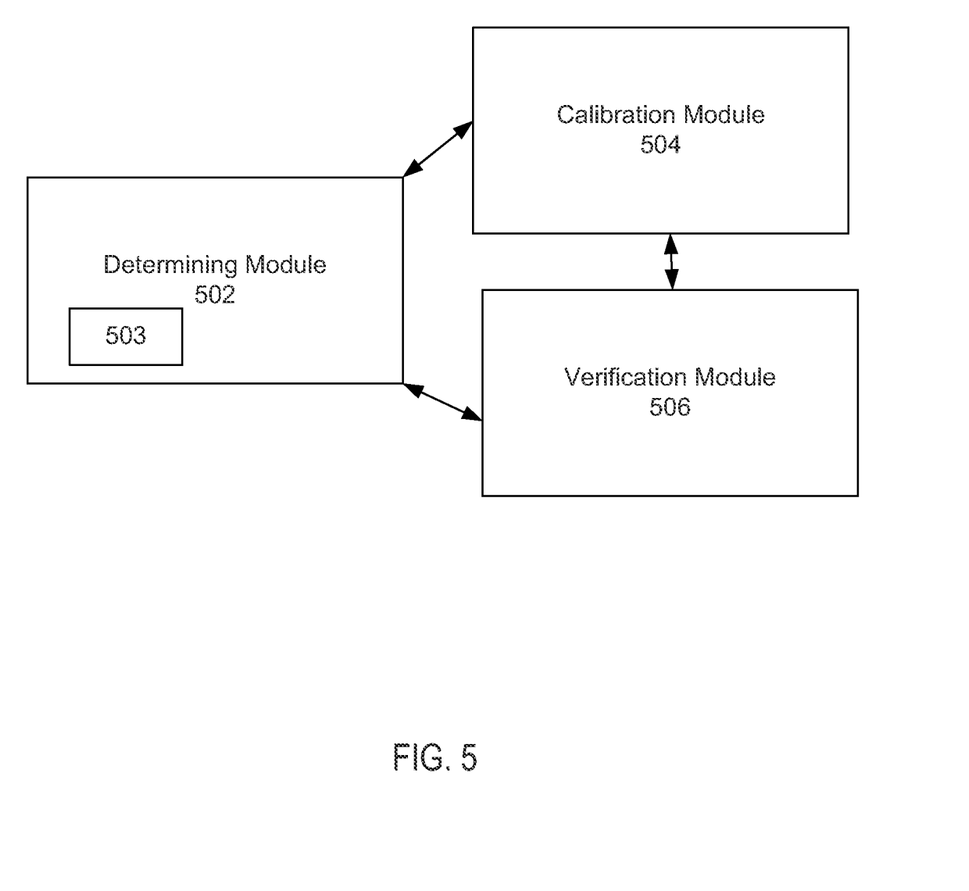
FIG. 5 schematically illustrates a plurality of modules that are configured to perform actions described herein.

FIG. 5 schematically illustrates a plurality of modules that are configured to perform actions described herein. A determining module 502 may be operatively or communicatively coupled with a calibration module 504 and/or a verification module 506. The determining module 502 may, for example, perform actions associated with determining or obtaining an average radio calibration result (ARCR) from one or more units of a manufacturing order. The determining module 502 may determine the ARCR by communicatively or operatively interacting with the calibration module 504 and/or the verification module 506.

For example, the determining module 502 may determine the ARCR by interacting with the calibration module 504 to calibrate the one or more units (e.g., the one or more units being less than a total number of units in the manufacturing order). The determining module 502 may interact with the verification module 506 to perform a verification test on the one or more units receiving the calibration to determine whether the one or more units are calibrated to the pre-determined specification. The determining module 502 may further interact with the calibration module 504 to record a radio calibration setting for each of the one or more units that is determined to be calibrated to the pre-determined specification and to calculate the average radio calibration result based on the recorded radio calibration setting. The determining module 502 may include a counter 503 to indicate a number of units in the manufacturing order to be used to calculate the ARCR.

In addition to the actions described above, the calibration module 504 may be further configured to apply an average radio calibration result obtained from one or more units of a manufacturing order to another unit of the manufacturing order and related actions described herein. The verification module 506 may be further configured to perform a verification test on the other unit to determine whether the other unit is calibrated to a pre-determined specification and related actions described herein. Generally, the determination module 502 may perform additional actions related to determining the ARCR as described herein, the calibration module 504 may perform additional actions related to calibration as described herein, and the verification module 506 may perform additional actions related to verification as described herein. To be clear, the actions described in FIGS. 1-3 may be performed by the determination module 502, the calibration module 504, and/or the verification module 506.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method for testing a plurality of radio devices associated with a manufacturing order, the method comprising:
   for a first set of radio devices of the plurality of radio devices, using a calibration routine to calibrate a value of a particular setting of each radio device of the first set of radio devices such that each radio device of the first set of radio devices is in accordance with a pre-determined specification;
   subsequent to the calibration of the value of the particular setting of each radio device of the first set of radio devices, determining an average value of the particular setting from among the first set of radio devices;
   for a second set of radio devices of the plurality of radio devices, setting a value of the particular setting of each radio device of the second set of radio devices to the average value of the particular setting determined from among the first set of radio devices; and
   subsequent to setting the value of the particular setting of each radio device of the second set of radio devices to the average value of the particular setting determined from among the first set of radio devices, using a verification routine to determine whether each radio device of the second set of radio devices is in accordance with the pre-determined specification, wherein the verification routine is different from the calibration routine, and wherein the verification routine is a calibration free routine such that the verification routine is not involved with any calibration to be performed.

2. The method of claim 1, wherein using the calibration routine to calibrate the value of the particular setting of each radio device of the first set of radio devices such that each radio device of the first set of radio devices is in accordance with the pre-determined specification comprises:
   testing each radio device of the first set of radio devices to determine whether each radio device of the first set of radio devices is in accordance with the pre-determined radio specification,
   wherein a total number of radio devices of the first set of radio devices is less than a total number of radio devices of the second set of radio devices.

3. The method of claim 2, further comprising using a counter to indicate a number of radio devices of the first set of radio devices to be used to calculate the average value of the particular setting.

4. The method of claim 3, wherein the number of radio devices of the first set of radio devices to be used to calculate the average value of the particular setting is substantially between 1% and 3% of a total number of radio devices of the manufacturing order.

5. The method of claim 1, wherein setting the value of the particular setting of each radio device of the second set of radio devices to the average value of the particular setting comprises loading the average value into a memory of a corresponding radio device of the second set of radio devices.

6. The method of claim 1, wherein setting the value of the particular setting of each radio device of the second set of radio devices to the average value of the particular setting and determining whether each radio device of the second set of radio devices is in accordance with the pre-determined specification, are performed for each radio device of the manufacturing order except for radio devices of the first set of radio devices from which the average value of the particular setting is determined.

7. The method of claim 1, further comprising:
   setting a value of the particular setting of each radio device of the second set of radio devices if a corresponding radio device of the second set of units is determined not to be in accordance with the pre-determined specification; and
   subsequent to setting the value of the particular setting of the corresponding radio device of the second set of radio devices, determining if the corresponding radio device is in accordance with the pre-determined specification.

8. The method of claim 7, further comprising updating the average value of the particular setting to include an updated setting to be used to calibrate the corresponding radio device of the second set of radio devices if the corresponding radio device is determined to be in accordance with the pre-determined specification.

9. The method of claim 1, wherein each radio device of the second set of radio devices is processed collectively as a single lot.

10. The method of claim 1, wherein setting the value of the particular setting of each radio device of the second set of radio devices to the average value of the particular setting further comprises applying an average value of a particular setting associated with at least one of transmitter power calibration, transmitter/receiver in-phase quadrature (IQ) calibration, local oscillator (LO) spurs calibration, and crystal frequency calibration, to each radio device of the second set of radio devices.

11. An apparatus comprising:
one or more processors; and
a memory storing (i) a setting module, (ii) a calibration module, and (iii) a determination module, wherein the one or more processors is configured to execute
the calibration module to (i) use a calibration routine to calibrate each radio device of a first set of radio devices of a manufacturing order, (ii) use a verification routine to determine whether each of the radio devices of the first set of radio devices is calibrated in accordance with a pre-determined specification, wherein the verification routine is different from the calibration routine, (iii) store a calibration setting for each of the radio devices of the first set of radio devices that is determined to be in accordance with the pre-determined specification, and (iv) calculate an average value of a particular setting based on the stored calibration setting for each calibrated radio device of the first set of radio devices,
the setting module to apply the average value of the particular setting from among the first set of radio devices to each radio device of a second set of radio devices of the manufacturing order, wherein a total number of radio devices of the first set of radio devices is less than a total number of radio devices of the second set of radio devices, and
the determination module to determine, using the verification routine that is different from the calibration routine, if each radio device of the second set of radio devices is in accordance with the pre-determined specification, wherein the verification routine is a calibration free routine such that the verification routine is not involved with any calibration to be performed.

12. The apparatus of claim 11, further comprising a counter to indicate a number of calibrated radio devices of the first set of radio devices to be used to calculate the average value of the particular setting.

13. The apparatus of claim 12, wherein the number of calibrated radio devices of the first set of radio devices to be used to calculate the average value of the particular setting is substantially between 1% and 3% of a total number of units of the manufacturing order.

14. The apparatus of claim 11, wherein the one or more processors is further configured to execute the setting module to store the average value of the particular setting into a memory of each radio device of the second set of radio devices.

15. The apparatus of claim 11, wherein the value of the particular setting is a first value of the particular setting, and wherein the one or more processors is further configured to execute:
the setting module to apply a second value of the particular setting to a corresponding radio device of the second set of radio devices if the corresponding radio device is determined not to be in accordance with the pre-determined specification; and
the determination module to determine whether the corresponding radio device of the second set of radio devices is in accordance with the pre-determined specification, subsequent to applying the second value of the particular setting to the corresponding radio device.

16. The apparatus of claim 15, wherein the one or more processors is further configured to execute the setting module to update the average value of the particular setting to include the second value of the particular setting to be used to calibrate the corresponding radio device of the second set of radio devices if the corresponding radio device is determined to be in accordance with the pre-determined specification.

17. The apparatus of claim 11, wherein the average value of the particular setting is associated with at least one of transmitter power calibration, transmitter/receiver in-phase quadrature (IQ) calibration, local oscillator (LO) spurs calibration, and crystal frequency calibration.

18. An apparatus comprising:
one or more processors; and
a memory having instructions stored thereon, which when executed by the one or more processors, result in
for a first set of radio devices of a plurality of radio devices of a manufacturing order, using a calibration routine to calibrate a value of a particular setting of each radio device of the first set of radio devices such that each radio device of the first set of radio devices is in accordance with a pre-determined specification,
subsequent to the calibration of the value of the particular setting of each radio device of the first set of radio devices, determining an average value of the particular setting from among the first set of radio devices,
for a second set of radio devices of the plurality of radio devices of the manufacturing order, setting a value of the particular setting of each radio device of the second set of radio devices to the average value of the particular setting determined from among the first set of radio devices, and
subsequent to setting the value of the particular setting of each radio device of the second set of radio devices to the average value of the particular setting determined from among the first set of radio devices, using a verification routine to determine whether each radio device of the second set of radio devices is in accordance with the pre-determined specification, wherein the verification routine is different from the calibration routine, and wherein the verification routine is a calibration free routine such that the verification routine is not involved with any calibration to be performed.

19. The apparatus of claim 17, further comprising a counter to indicate a number of calibrated radio devices of the first set of radio devices of the manufacturing order to be used to calculate the average value of the particular setting.

* * * * *